United States Patent
Matsui

(10) Patent No.: US 7,721,113 B2
(45) Date of Patent: May 18, 2010

(54) DATA ALTERATION DETECTING METHOD, DATA ALTERATION DETECTING DEVICE AND DATA ALTERATION DETECTING PROGRAM

(75) Inventor: Takayuki Matsui, Tokyo (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 1346 days.

(21) Appl. No.: 11/082,113

(22) Filed: Mar. 17, 2005

(65) Prior Publication Data

US 2005/0204248 A1 Sep. 15, 2005

Related U.S. Application Data

(63) Continuation of application No. PCT/JP03/00900, filed on Jan. 30, 2003.

(51) Int. Cl.
G06F 11/30 (2006.01)
G06F 12/14 (2006.01)
H04L 9/32 (2006.01)
H04K 1/00 (2006.01)
H04L 9/00 (2006.01)
H04L 9/38 (2006.01)

(52) U.S. Cl. .................. 713/189; 713/168; 713/177

(58) Field of Classification Search .................. 713/189
See application file for complete search history.

(56) References Cited

U.S. PATENT DOCUMENTS

| | | | |
|---|---|---|---|
| 4,933,969 A | * | 6/1990 | Marshall et al. .............. 713/177 |
| 5,982,890 A | | 11/1999 | Akatsu |
| 6,144,745 A | | 11/2000 | Akiyama et al. |
| 2004/0019785 A1 | * | 1/2004 | Hawkes et al. .............. 713/168 |

FOREIGN PATENT DOCUMENTS

| | | |
|---|---|---|
| JP | 9-311806 | 12/1997 |
| JP | 10-283262 | 10/1998 |
| JP | 10-283263 | 10/1998 |
| JP | 10-283264 | 10/1998 |
| JP | 2000-132459 | 5/2000 |
| JP | 2000-285024 | 10/2000 |
| JP | 2001-232436 | 8/2001 |
| JP | 2001-337600 | 12/2001 |
| JP | 2002-82834 | 3/2002 |
| JP | 2002-229835 | 8/2002 |
| JP | 2002-259216 | 9/2002 |
| JP | 2002-351864 | 12/2002 |

OTHER PUBLICATIONS

Notice of Rejection Ground (for the corresponding Japanese patent application) dated Jul. 15, 2008 with Partial English translation.

* cited by examiner

*Primary Examiner*—Shin-Hon Chen
(74) *Attorney, Agent, or Firm*—Kratz, Quintos & Hanson, LLP

(57) ABSTRACT

An inter-record alteration detection code verification unit 36 calculates an inter-record alteration detection code by merging a record alteration detection code stored in a record to read from a database 34 and a record alteration detection code in the immediately previous record so as to generate a code and applying a predetermined hash operation to the generated code. The verification unit verifies whether the calculated inter-record alteration code coincides with the inter-record alteration detection code stored in the record to read. If they coincide with each other, data is determined to be not altered.

15 Claims, 17 Drawing Sheets

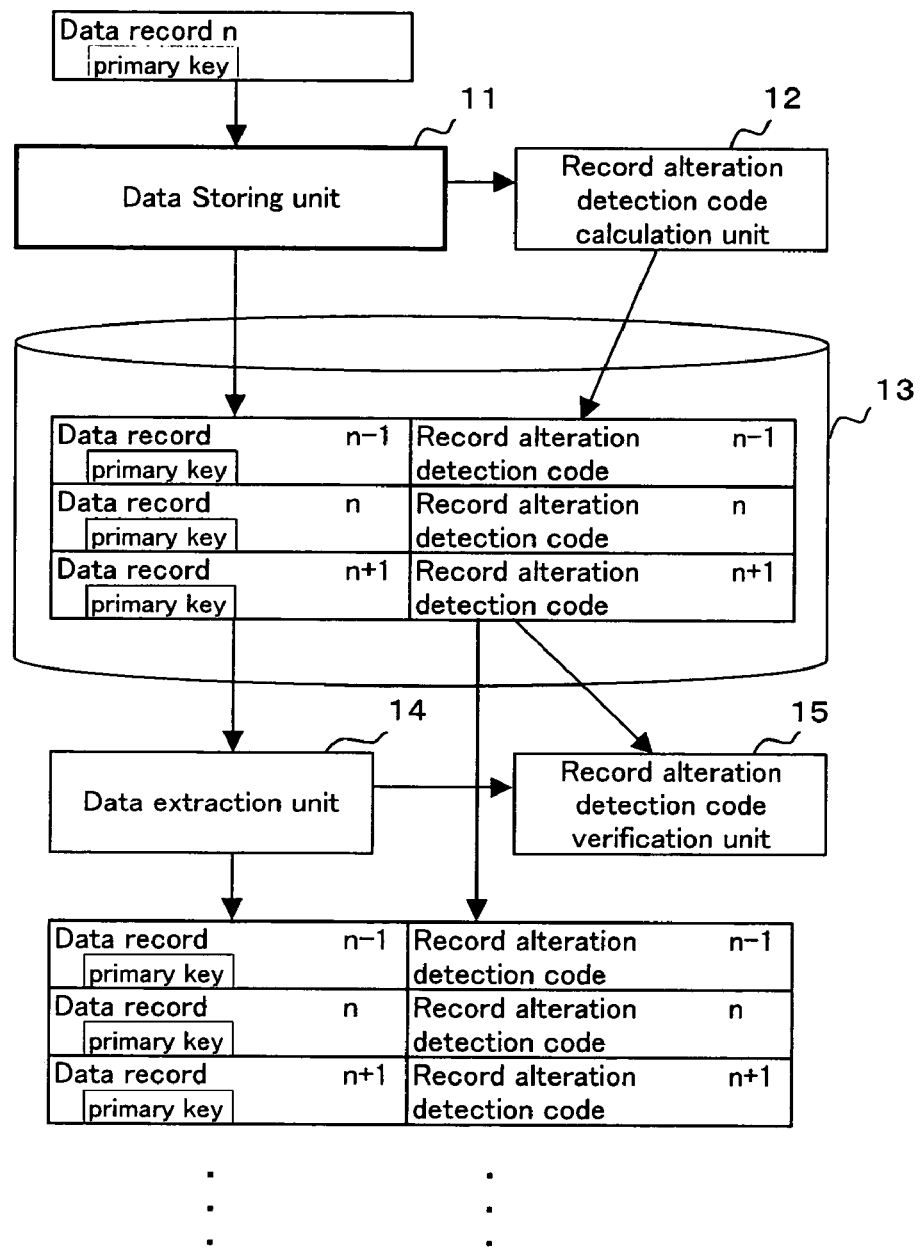
F I G. 16

| Record#1 | #1 alteration detection code |
|---|---|
| Record#2 | #2 alteration detection code |
| Record#3 | #3 alteration detection code |
| | |
| Record#100 | #100 alteration detection code |

| 1~100 alteration detection code |
|---|

F I G. 1 7

DATA ALTERATION DETECTING METHOD, DATA ALTERATION DETECTING DEVICE AND DATA ALTERATION DETECTING PROGRAM

CROSS REFERENCE TO RELATED APPLICATION

This application is a continuation of international PCT application No. PCT/JP03/00900 filed on Jan. 30, 2003.

BACKGROUND OF THE INVENTION

1. Field of the Invention

The present invention relates to an alteration detection method of data stored in a data storage unit, a data alteration detection device and a data alteration detection program.

2. Description of the Related Art

With the spread of networks, a possibility that an illegal access is made to a database and data is altered has been increased. In order to detect such an illegal data alteration, for example, a data alteration detection method shown in FIG. 16 is considered.

In the data alteration detection method shown in FIG. 16, when a data storing unit 11 writes log data in a database 12, a record alteration detection code calculation unit 12 applies a prescribed operation to data to calculate a record alteration detection code and attaches the record alteration detection code to the data.

When reading data, a data extraction unit 14 reads the relevant record from the database 13. Then, a record alteration detection code verification unit 15 applies a prescribed operation to the read data to calculate a record alteration detection code and verifies whether the calculated record alteration detection code coincides with the recode alteration detection code attached to the data to determine whether the data is altered.

However, by the alteration detection method, the addition/deletion of a record cannot be detected.

In order to detect the alteration, such as addition/deletion, of a record, an alteration detection code must be provided for a specific record unit. For example, as shown in FIG. 17, alteration detection codes must be calculated and stored for all the data records 1-100 in advance. In order to verify addition/deletion to/from records 1-5, alteration detection codes must be calculated for all the data records 1-100, and it must be verified whether the respective calculated alteration detection codes coincide with the respective stored alteration detection codes of all the records 1-100. Therefore, in order to verify the alteration of several records, its data alteration detection process takes much time, which is a problem.

Japanese Patent Application No. 2002-259216 (Patent Reference 1) discloses that when transmitting an electronic file, a describer H for verifying the integrity of each unit file and a describer C for verifying the continuity of each unit file (whether a previous or subsequent unit file is lost) are provided.

However, in the method disclosed by Patent Reference 1, when the structure of a unit file is known, the describer C for verifying the continuity of each unit file can be easily generated. Therefore, it is difficult to prevent the alteration of data.

SUMMARY OF THE INVENTION

An object of the present invention is to be able to detect the alteration, such as addition, deletion and the like, of data without the increase of a process time for detecting data alteration.

In the data alteration detection method of the present invention, when writing data in the data storage unit in a prescribed order, the data alteration detection code of data to write current time is calculated. Then, an inter-data alteration detection code is calculated based on both the data alteration detection code of at least the immediately previous data of the data to write current time and the data alteration detection code of the data to write current time. And the data alteration detection code of the data to write current time and the inter-data alteration detection code are stored data storage unit in correspondence with the data to write current time. Then, when reading the data stored in the data storage unit, the data alteration detection code of data to read is calculated, and it is verified whether the calculated data alteration detection code coincides with the data alteration detection code stored in correspondence with the data to read. Then, an inter-data alteration detection code is calculated based on the data alteration detection code of the data to read and the data alteration detection code of the immediately previous data of the data, and it is verified whether the calculated inter-data alteration detection code coincides with the inter-data alteration detection code stored in correspondence with the data to read. Thus, it is verified whether data is altered.

According to the present invention, an inter-data alteration detection code is calculated using the alteration detection codes of at least two segments of data. When reading data, the alteration, such as modification, deletion, addition and the like, of data can be detected by verifying the inter-data alteration detection code.

Since in order to alter data, the record alteration detection codes of at least two segments of data and the inter-record alteration detection code must be completely generated, it is very difficult to alter data. As a result, the alteration of data can be detected more accurately.

For example, when detecting alteration to a plurality of segments of consecutive data, the alteration, such as modification, addition, deletion and the like, of the target plurality of segments of data can be detected by calculating only the respective inter-data alteration detection codes between two segments of individual target data and between its leading data and the immediately previous data of the data, and there is no need to calculate the alteration detection code of data other than them. Therefore, calculation time can be shortened.

In another data alteration detection method of the present invention, when writing data in the data storage unit in a prescribed order, an inter-data alteration detection code is calculated based on data to write current time and the immediately previous data of the data, and is stored in the data storage unit in correspondence with the data to write current time. When reading data stored in the data storage unit, an inter-data alteration detection code is calculated based on both the data to read and at least the immediately previous data of the data, and it is verified whether the calculated inter-data alteration detection code coincides with the inter-data alteration detection code stored in correspondence with the data to read. Thus, it is detected whether data is altered.

According to this invention, an inter-data alteration detection code is calculated using at least two segments of data. When reading data, the alteration, such as modification, deletion, addition and the like, of data can be detected by verifying the inter-data alteration detection code. In this case, since it is sufficient to calculate an inter-data alteration detection code, a process time for calculation of alteration detection codes and a process time for detection can be shortened. Since an alteration detection code is calculated based on two segments of data, it is difficult to generate an illegal alteration detection code, compared with the case where the alteration detection code is calculated based on one segment of data.

The data alteration detection device of the present invention comprises a data alteration detection code calculation unit calculating the data alteration detection code of data to write into a data storage unit, an inter-data alteration detection code calculation unit calculating an inter-data alteration detection code, based on both the data alteration detection code of at least the immediately previous data of the data to write and the data alteration detection code, a data writing unit relating and writing the data, the data alteration detection code and the inter-data alteration detection code into the data storage unit, a data reading unit reading data from the data storage unit, a data alteration detection code verification unit calculating the data alteration detection code of the read data and verifying whether the calculated data alteration detection code coincides with the data alteration detection code stored in correspondence with the read data, and an inter-data alteration detection code verification unit calculating an inter-data alteration detection code, based on both the data alteration detection code of the read data and the data alteration detection code of at least the immediately previous data of the data and verifying whether the inter-data alteration detection code coincides with the inter-data alteration detection code stored in correspondence with the read data.

According to the present invention, an inter-data alteration detection code is generated from the alteration detection codes of at least two segments of data. When reading data, the alteration, such as modification, deletion, addition and the like, of data can be detected by verifying the inter-data alteration detection code.

Alternatively, the data alteration detection code calculation unit and the inter-data alteration detection code calculation unit can write the generated data alteration detection code and inter-data alteration detection code, respectively, into the data storage unit.

BRIEF DESCRIPTION OF DRAWINGS

FIG. 16 shows the conventional data alteration detection method (1).

FIG. 17 shows the conventional data alteration detection method (2).

DESCRIPTION OF THE PREFERRED EMBODIMENTS

The preferred embodiments of the present invention are described below with reference to the drawings.

Figure 1:
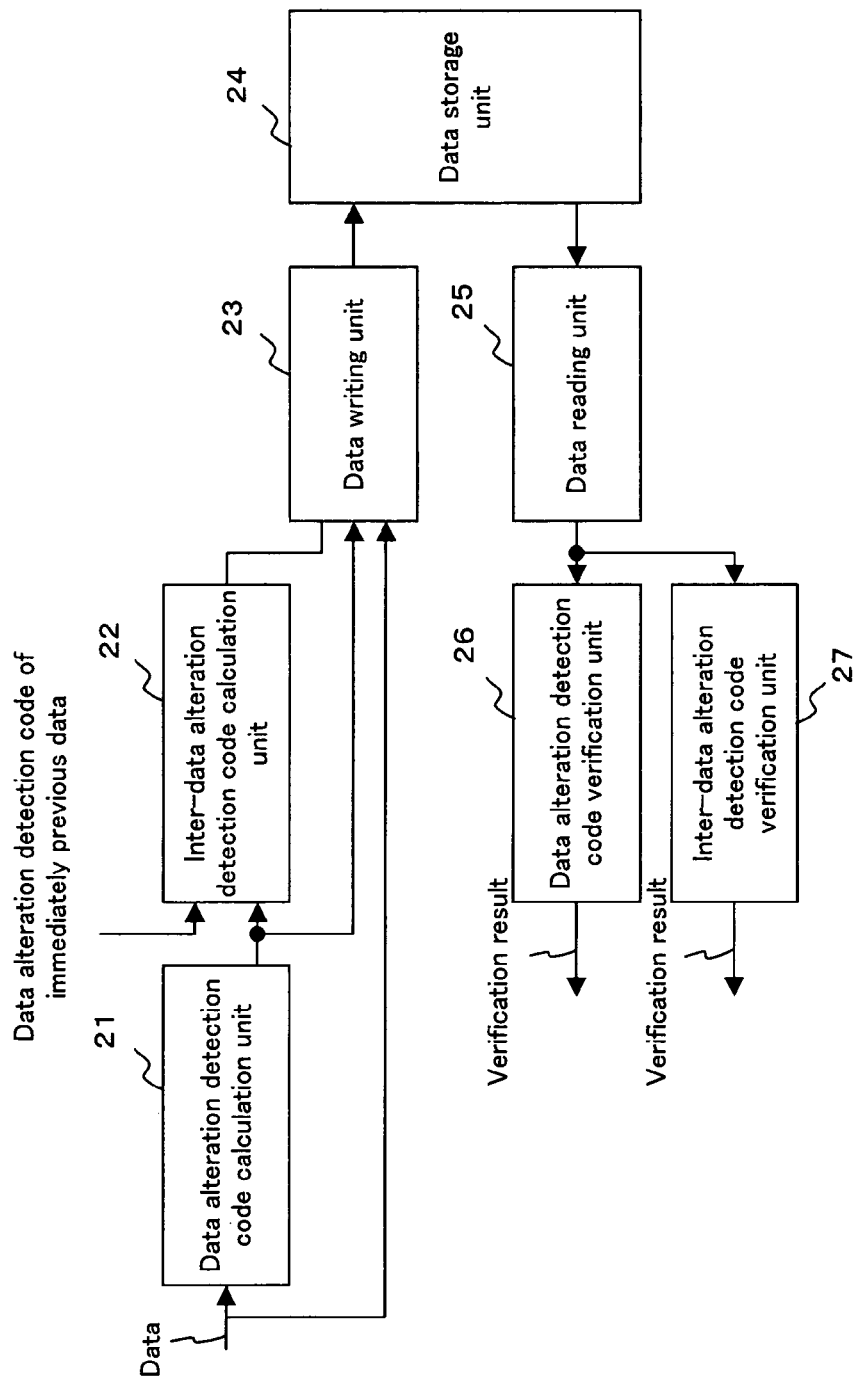
FIG. 1 shows the basic configuration of the present invention.

FIG. 1 shows the basic configuration of the data alteration detection device of the present invention.

A data alteration detection code calculation unit 21 for calculating the data alteration detection code of data to write into a data storage unit 24.

An inter-data alteration detection code calculation unit 22 for calculating an inter-data alteration detection code, based on both the data alteration detection code of at least the immediately previous data of the data to write and the data alteration detection code.

A data writing unit 23 for relating and writing the data, the data alteration detection code and the inter-data alteration detection code into the data storage unit 24.

A data reading unit 25 for reading data from the data storage unit 24.

A data alteration detection code verification unit 26 for calculating the data alteration detection code of the read data and verifying whether the calculated data alteration detection code coincides with the data alteration detection code stored in correspondence with the read data.

An inter-data alteration detection code verification unit 27 for calculating an inter-data alteration detection code, based on both the data alteration detection code of the read data and the data alteration detection code of at least the immediately previous data of the data and verifying whether the inter-data alteration detection code coincides with the inter-data alteration detection code stored in correspondence with the read data.

According to this configuration, an inter-data alteration detection code is generated from the alteration detection codes of at least two segments of data. When reading data, the alteration, such as modification, deletion, addition and the like, of data can be detected by verifying the inter-data alteration detection code.

Alternatively, the data alteration detection code calculation unit 21 and the inter-data alteration detection code calculation unit 22 can write the generated data alteration detection code and inter-data alteration detection code, respectively, into the data storage unit.

Figure 2:
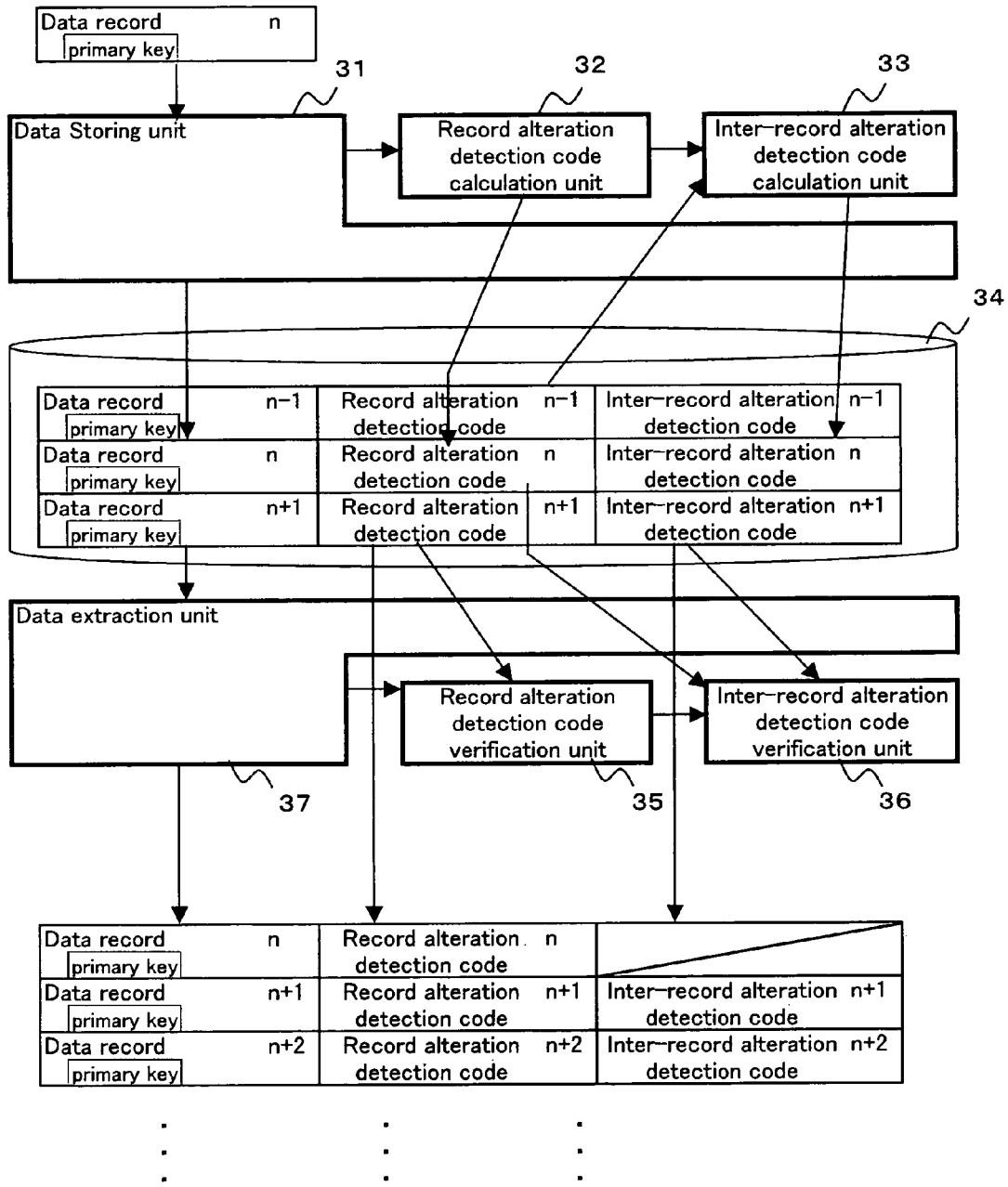
FIG. 2 shows the data alteration detection method of the first preferred embodiment.

FIG. 2 shows the data alteration detection method of the first preferred embodiment. FIG. 2 also shows the configuration of the data alteration detection device adopting the data alteration detection method of the first preferred embodiment. This data alteration detection device can be realized by a personal computer or the like.

A data storing unit (data writing unit) 31 writes generated data into a database (data storage unit) 34.

A record alteration detection code calculation unit 32 applies a prescribed operation, such as a hash operation or the like, to data to write (data of the current record) to calculate a record alteration detection code, and outputs the calculated record alteration detection code in an inter-record alteration detection code calculation unit 33.

The record alteration detection code calculation unit 32 also writes the calculated record alteration detection code into the current record of the database 34.

The inter-record alteration detection code calculation unit 33 calculates an inter-record alteration detection code, based on both the record alteration detection code of at least the immediately previous record of the current record and the record alteration detection code calculated by the record alteration detection code calculation unit 32.

Each record of the database 34 stores a primary key indicating the order of data (update date, order, etc.), as shown in FIG. 2. Therefore, the immediately previous record of the current record can be searched for by retrieving data, using this primary key.

The data storing unit 31, record alteration detection code calculation unit 32 and inter-record alteration detection code calculation unit 33 store data, a record alteration detection code and an inter-record alteration detection code in one record of the database 34, as shown in FIG. 2.

When reading data, the data extraction unit (data reading unit) 37 reads the data of a corresponding record and outputs the data to the record alteration detection code verification unit 35.

The record alteration detection code verification unit 35 applies a prescribed operation to the read data to calculate a record alteration detection code and verifies whether the calculated record alteration detection code coincides with the record alteration detection code of the read record.

An inter-alteration detection code verification unit 36 calculates an inter-record alteration detection code, based on both the record alteration detection code of the immediately previous record and the record alteration detection code of the read record, and verifies whether the calculated inter-record alteration detection code coincides with the inter-record alteration detection code of the read record.

If the data read from the database 34 is altered, it is determined by the verification that the record alteration detection codes or the inter-record alteration detection codes do not coincide. Thus, the alteration, such as modification, deletion, addition and the like, of data can be detected.

Although in FIG. 2, the record alteration detection code calculation unit 32 and the inter-record alteration detection code calculation unit 33 write the record alteration detection code and the inter-record alteration detection code, respectively, into the database 34, alternatively, the data storing unit 31 receives an alteration detection code from each of the record alteration detection code calculation unit 32 and the inter-record alteration detection code calculation unit 33, and writes those alteration detection codes into the database 34.

Next, the respective processes of the record alteration detection code calculation unit 32, inter-record alteration detection code calculation unit 33, record alteration detection verification unit 35 and inter-record alteration detection code verification unit 36 of the first preferred embodiment are described with reference to the flowcharts shown in FIGS. 3 through 6. The following processes are performed by the central processing unit (CPU) of the data alteration detection device.

Firstly, the process of the record alteration detection code calculation unit 32 is described with reference to the flowchart shown in FIG. 3.

Figure 3:
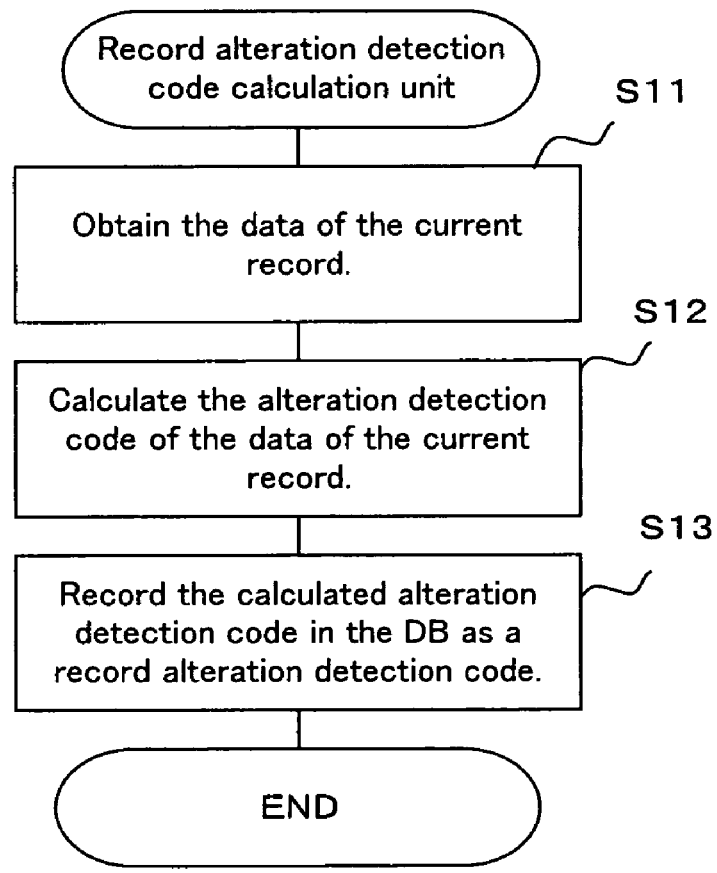
FIG. 3 is a flowchart showing the process of a record alteration detection code calculation unit.

The record alteration detection code calculation unit 32 obtains data to write (data of the current record) (S11 shown in FIG. 3).

In the process in step S11, for example, if there is a data write request, a record is generated in the database 34. If data is simultaneously written into the record, data is obtained from the record of the database 34. If data to write is temporarily stored in the data storing unit 31 and is finally stored in the database 34 together with an alteration detection code after the calculation of the alteration detection code, data is obtained from the data storing unit 31.

Then, the record alteration detection code of the current record is calculated (S12 shown in FIG. 3). The record alteration detection code is calculated, for example, by applying a prescribed hash operation to data. Alternatively, some operation can be applied to data, and a message digest can be generated by applying a hash operation to the alteration detection code. Then, a digital signature can be generated by encoding the message digest, using the secret key of Rivest-Shamir-Adleman (RSA) encryption, and can be used as an alteration detection code.

Then, the calculated alteration detection code is written into the corresponding record of the database 34 as a record alteration detection code (S13 shown in FIG. 3).

Next, the process of an inter-record alteration detection code calculation unit 33 is described with reference to the flowchart shown in FIG. 4.

Figure 4:
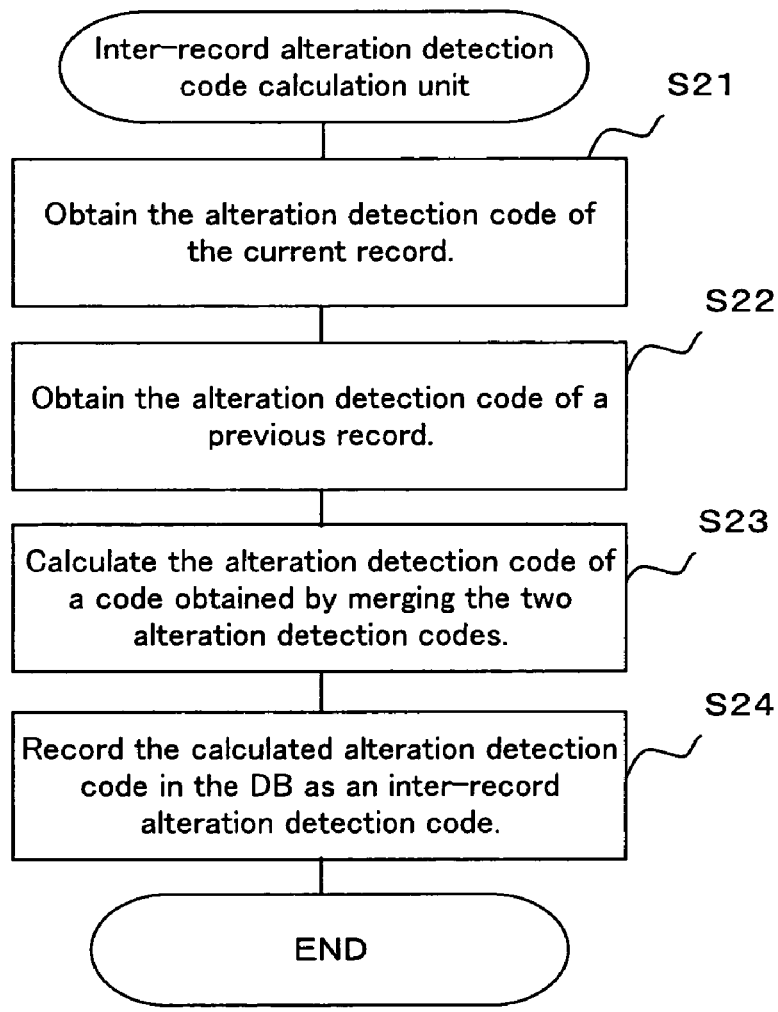
FIG. 4 is a flowchart showing the process of an inter-record alteration detection code calculation unit.

The inter-record alteration detection code calculation unit 33 obtains the record alteration detection code of data to write (data of the current record) (S21 shown in FIG. 4).

Then, the record alteration detection code of the immediately previous record of the data to write is obtained from the database 34 (S22 shown in FIG. 4). Since a primary key indicating the order of data (order, update date, etc.) is written in each record, the immediately previous record can be searched for, using the primary key.

Then, an alteration detection code is calculated by applying a prescribed operation, such as a hash operation, to a code obtained by merging the two record alteration detection codes or generating a digital signature (S23 shown in FIG. 4).

The calculated alteration detection code is written into the corresponding record of the database 34 as an inter-record alteration detection code (S23 shown in FIG. 4).

Next, the process of the data storing unit 31 is described with reference to the flowchart shown in FIG. 5.

Figure 5:
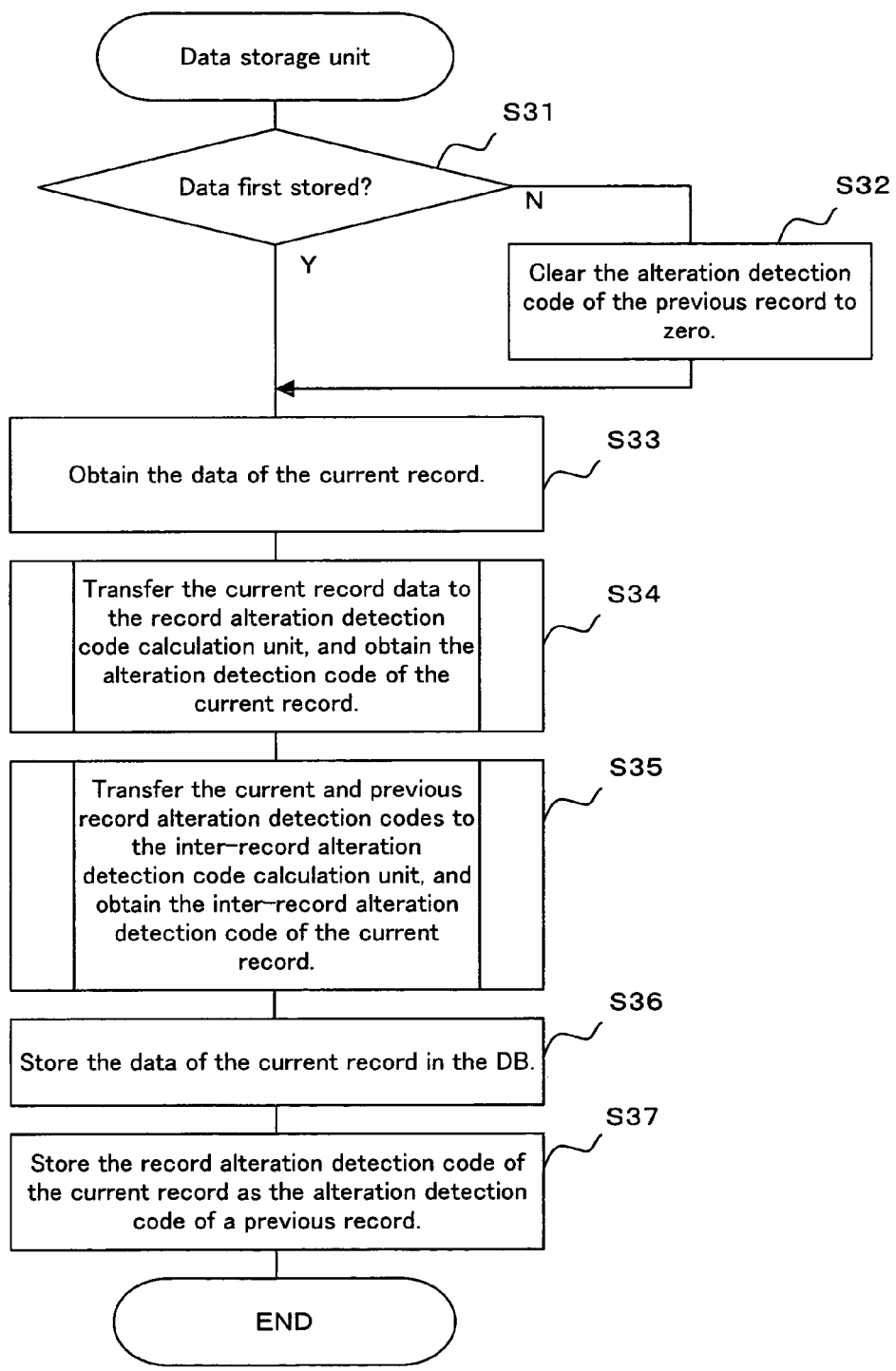
FIG. 5 is a flowchart showing the process of a data storage unit.

It is determined whether data to be written into the database 34 is the first data (S31 shown in FIG. 5).

If it is the first data (yes in S31), the process proceeds to step S32, and a register storing the alteration detection code of the previous record is cleared to zero.

If it is not the first data (no in S31), the process proceeds to step S33, and data to be written in the current record is obtained. If data is written in a record when the data is generated or obtained, data is obtained from the record into which the data is written.

Then, the data of the current record is transferred to the record alteration detection code calculation unit 32, a record alteration detection code is obtained from the record alteration detection code calculation unit 32 (S34 shown in FIG. 5).

Then, the record alteration detection code of the current record and the record alteration detection code of the immediately previous record are transferred to the inter-record alteration detection code calculation unit 33, and an inter-record alteration detection code is obtained from the inter-record alteration detection calculation unit 33 (S35 shown in FIG. 5).

Then, data is written into the corresponding record of the database 34 (S36 shown in FIG. 5).

Then, the record alteration detection code of the current record is stored in a register as the alteration detection code of the previous record (S37 shown in FIG. 5). This makes it unnecessary to retrieve the record alteration detection code of the immediately previous record from the database 34.

If, for example, data is written in the n-th record in FIG. 2, by the processes described in FIGS. 3 through 5, firstly, the record alteration detection code of data to write is calculated. Then, the record alteration detection code of the immediately previous record stored in the register is obtained. Alternatively, the record alteration detection code stored in the (n−1)th record is obtained by searching for the immediately previous (n−1)th record, using the primary key. Then, an inter-record alteration detection code is calculated based on both the record alteration detection code of the immediately previous record and the calculated record alteration detection code. Then, those alteration detection codes are written into the n-th record. Thus, the data as well as the record alteration detection and the inter-record alteration detection code are written in the n-th record.

Next, the process of the record alteration detection code verification unit 35 is described with reference to the flowchart shown in FIG. 6.

Figure 6:
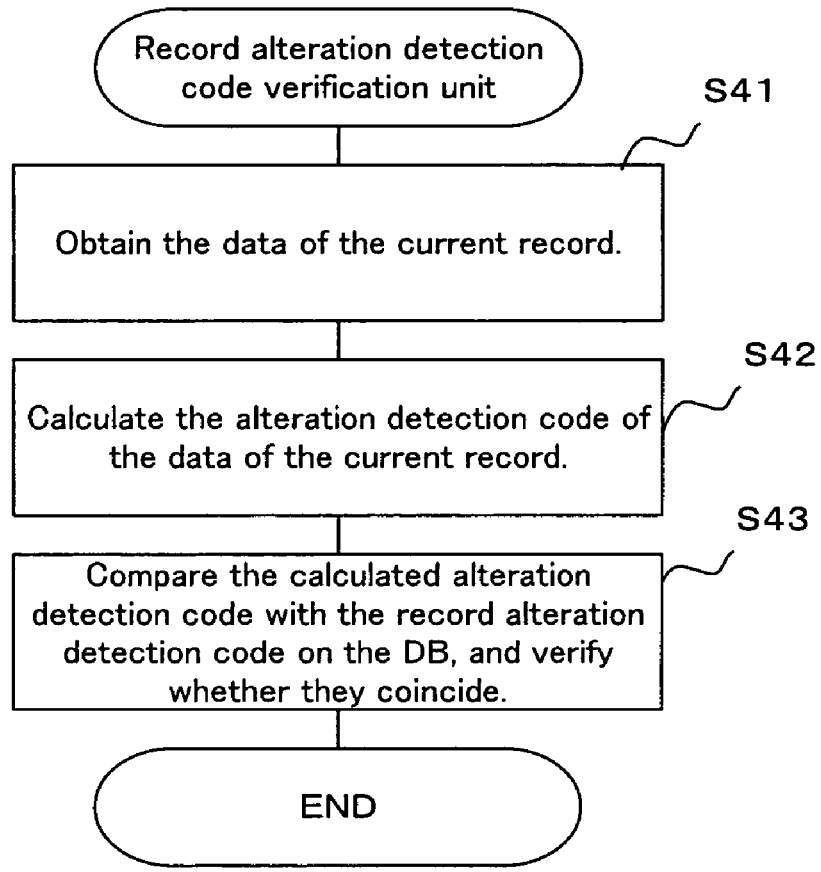
FIG. 6 is a flowchart showing the process of a record alteration detection code verification unit.

The data of a record to read (data of the current record) is obtained (S41 shown in FIG. 6).

Then, an alteration detection code is calculated by applying a prescribed operation, such as a hash operation, to the data of the record to read (S42 shown in FIG. 6). Alternatively, a digital signature obtained by encoding a code obtained by applying a prescribed hash operation to the data, using a private key of RSA encryption or the like, as the alteration detection code.

Then, it is verified whether the calculated record alteration detection code coincides with the record alteration detection code stored in the record to read (S43 shown in FIG. 6).

By the process of the record alteration detection code verification unit 35, it can be verified whether the record alteration detection code that is calculated using the data read from the database 34 coincides with the record alteration detection code stored in the record, and accordingly, it can be determined whether the data is altered.

Next, the process of the inter-record alteration detection code verification unit 36 is described with reference to the flowchart shown in FIG. 7.

Figure 7:
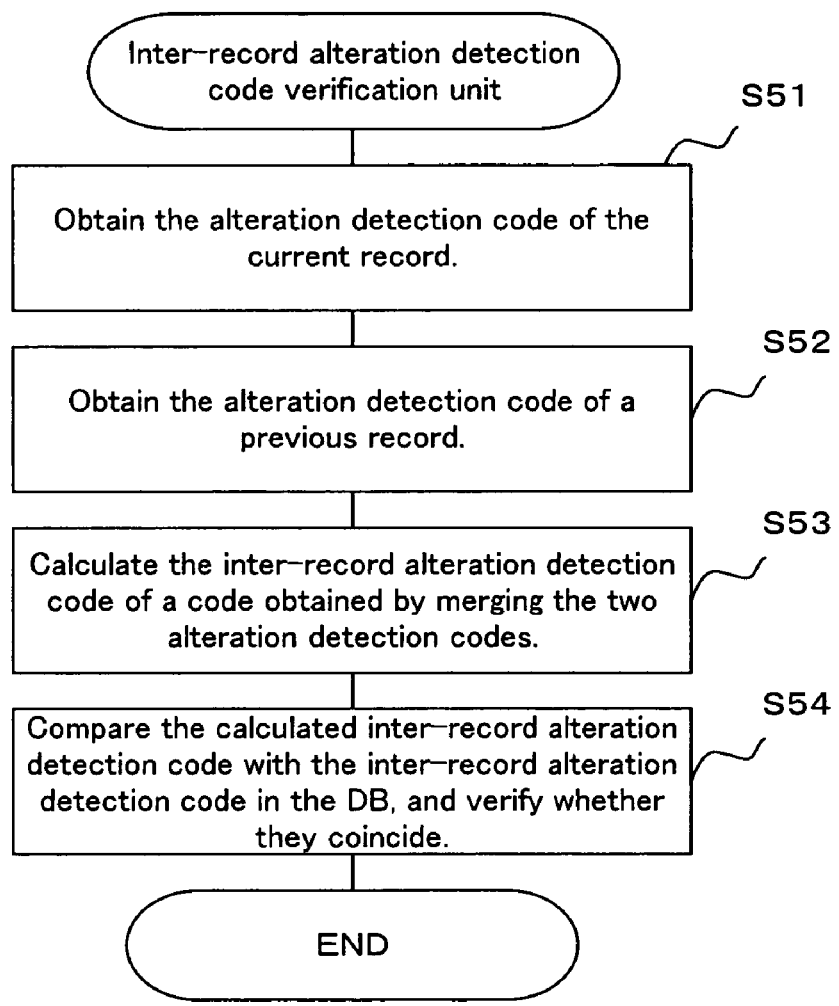
FIG. 7 is a flowchart showing the process of an inter-record alteration detection code verification unit.

The record alteration detection code of the current record is obtained from the record alteration detection code calculation unit 35 (S51 shown in FIG. 7).

Then, the record alteration detection code of the immediately previous record by searching for the immediately previous record of the current record, using a primary key indicating the order of a record S52 shown in FIG. 7).

Then, an inter-record alteration detection code is calculated by applying a prescribed hash operation to a code obtained by merging the respective record alteration detection codes of the current record and the immediately previous record (S53 shown in FIG. 7).

Then, it is verified whether the calculated inter-record alteration detection code coincides with the inter-record alteration detection code of the current record (S54 shown in FIG. 7).

By the process of the inter-record alteration detection code verification unit 36, an inter-record alteration detection code can be calculated using the respective record alteration detection codes of the current record and the immediately previous record, and it can be verified whether the calculated inter-record alteration detection code coincides with the inter-record alteration detection code stored in the current record. Thus, the alteration, such as deletion, addition and the like, can be detected.

Next, The process of the data extraction unit 37 is described with reference to the flowchart shown in FIG. 8.

Figure 8:
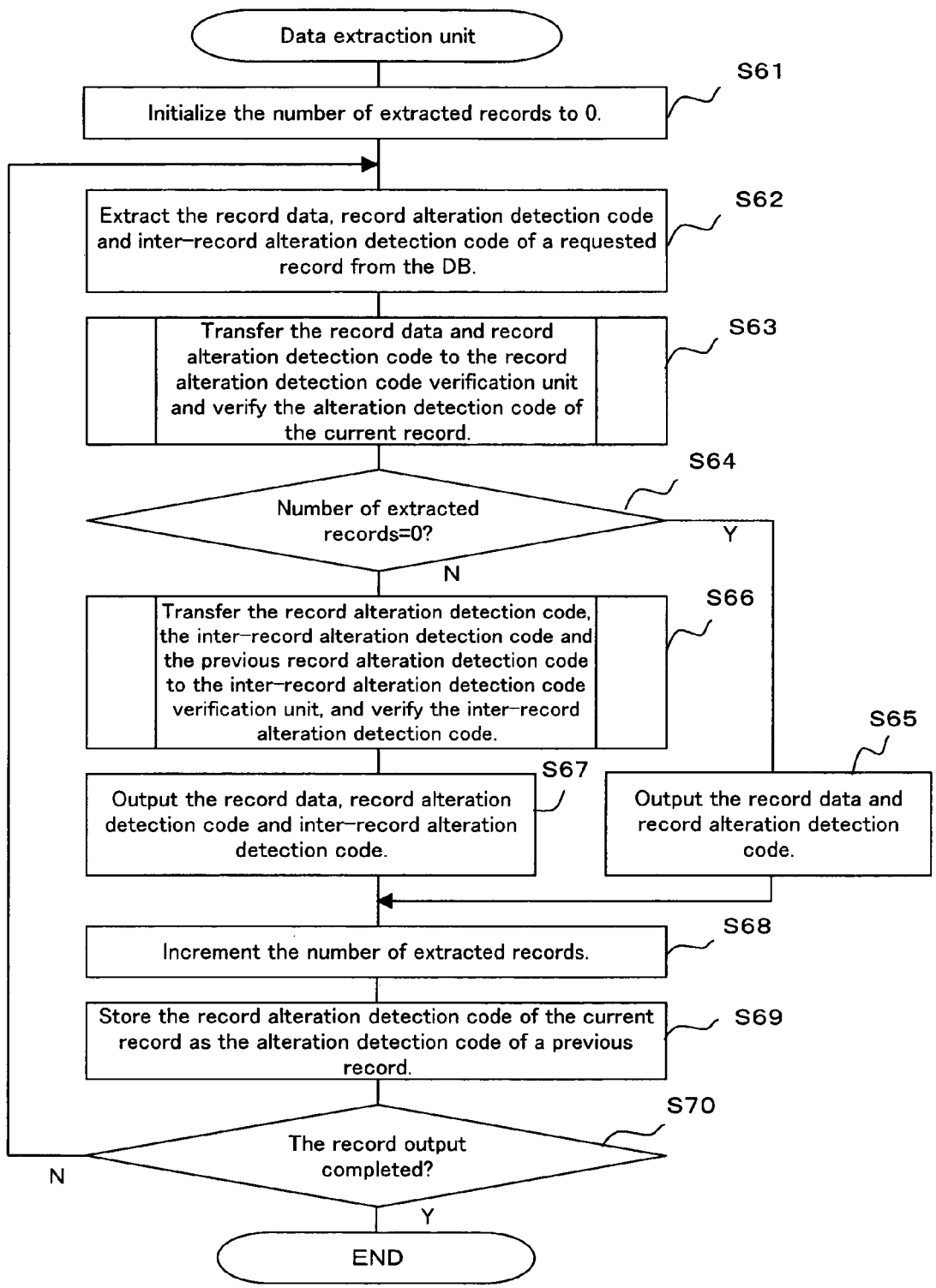
FIG. 8 is a flowchart showing the process of a data extraction unit.

0 is set as the initial value of the number of extracted records from the database 34 (S61 shown in FIG. 8).

Then, the data of requested record, a record alteration detection code and an inter-record alteration detection code are read from the database 34 (62 shown in FIG. 8).

Then, the record data and the record alteration detection code are transferred to the record alteration detection code verification unit 35, and the alteration detection code of the current record is verified (S63 shown in FIG. 8).

Then, it is determined whether the number of records to extract is 0, that is, whether the request record is leading one (S64 shown in FIG. 8).

If the number of records to extract is 0 (yes in S64), the process proceeds to step S65, and both the data and record alteration detection code of the current record are outputted to a requester. In this case, since it is the leading record requested to output, the inter-record alteration detection code is not outputted.

However, if the number of extracted records is not 0 (no in S64), that is, it is not the leading record requested to output, the process proceeds to step S66. In step S66, the record alteration detection code, inter-record alteration detection code of the current record and the record alteration detection code of the immediately previous record are transferred to the inter-record alteration detection code verification unit 36, and the inter-record alteration detection code is verified.

If the record alteration detection code verification unit 35 determines that the record alteration detection codes coincide and if the inter-record alteration detection code verification unit 36 determines that the inter-record alteration detection codes coincide, the record data, record alteration detection code and inter-record alteration detection code of the current record are outputted to the requester (S67 shown in FIG. 8).

Then, the number of extracted codes is incremented (S68 shown in FIG. 8), and the record alteration detection code of the current code is stored in the register as the record alteration detection code of the previous code (S69 shown in FIG. 8).

Then, it is determined whether the output of all requested records is completed (S70 shown in FIG. 8).

If the output of all the records is not completed, the process returns to step S62, the above-mentioned process is repeated.

By the above-mentioned processes in FIGS. 6 though 8, if, for example, the data of the n-th record and after shown in FIG. 2 is read, as to the n-th record, only a record alteration detection code is verified, and as to (n+1)th record, a record alteration detection code is calculated using it. Then, by verifying whether the calculated record alteration detection code coincides with the record alteration detection code stored in the (n+1)th record, it can be verified whether the record is altered. Furthermore, an inter-record alteration detection code is calculated based on both the record alteration detection code of the n-th record, which is the immediately previous record of the (n+1)th record and the record alteration detection code of the (n+1) record, and it is verified whether the calculated inter-record alteration detection code coincides with the inter-record alteration detection code stored in the (n+1)th record. Thus, the alteration, such as the deletion and addition of a record, the modification of data and the like, can be detected.

According to the first preferred embodiment, by calculating an inter-record alteration detection code, based on the respective record alteration detection codes of the current record and the immediately previous record and storing the inter-record alteration detection code in the current record, for example, the alteration, such as deletion, addition and the like, of a record can be detected.

Since the alteration, such as deletion, addition and the like, of a record can be detected from the record alteration detection codes of at least two records, a process time for detecting the alteration of data can be shortened, compared with the conventional method of calculating the entire alteration detection code, using the alteration detection codes of a lot of records.

Furthermore, since by re-calculating the inter-record alteration detection code of the immediately subsequent record of the record, the data of a specific record can be legally modified, instead of being illegally altered, a time needed to re-calculate an alteration detection code can be shortened.

Figure 9:
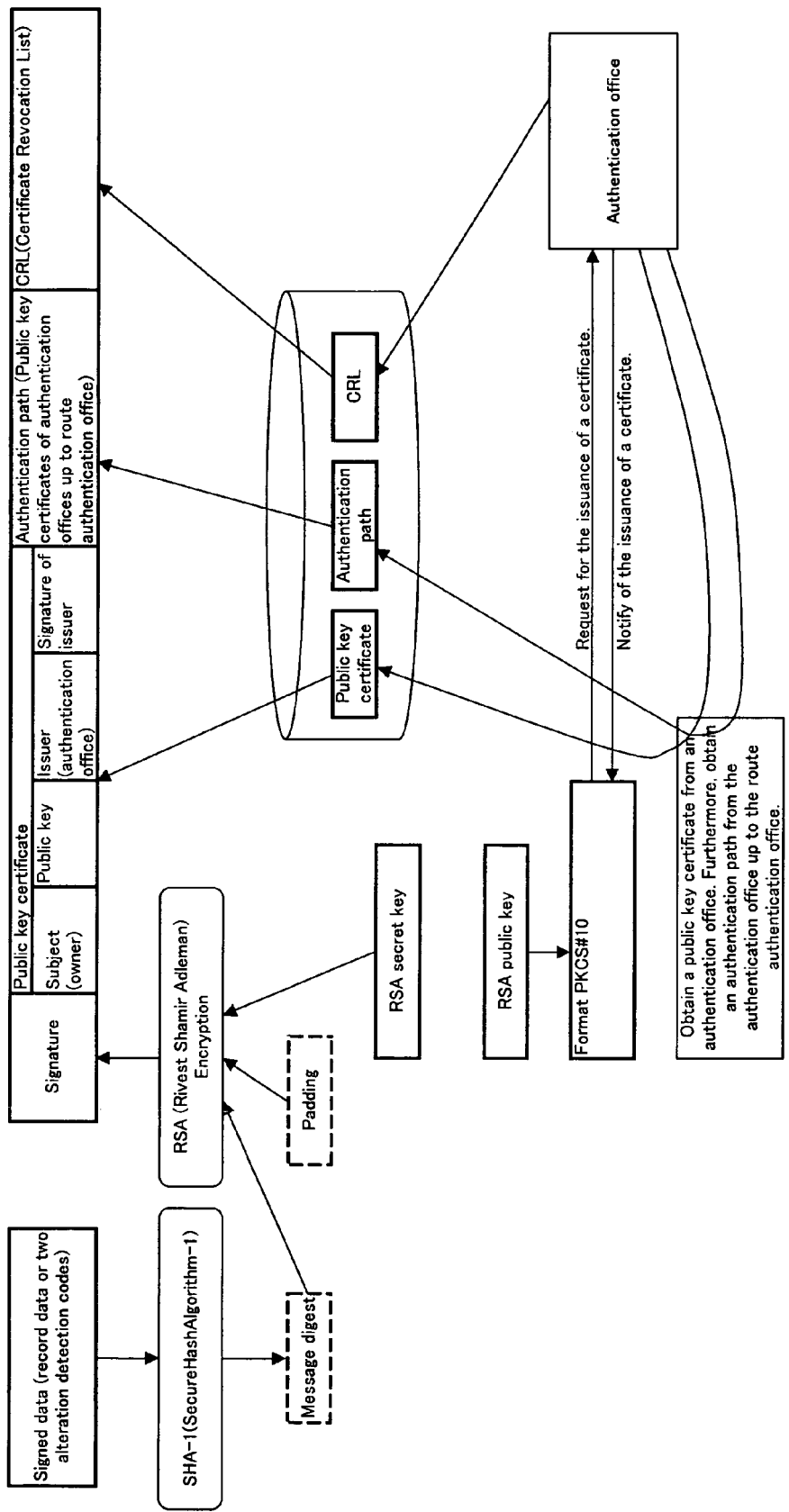
FIG. 9 shows the data alteration detection method of the second preferred embodiment.
Figure 10:
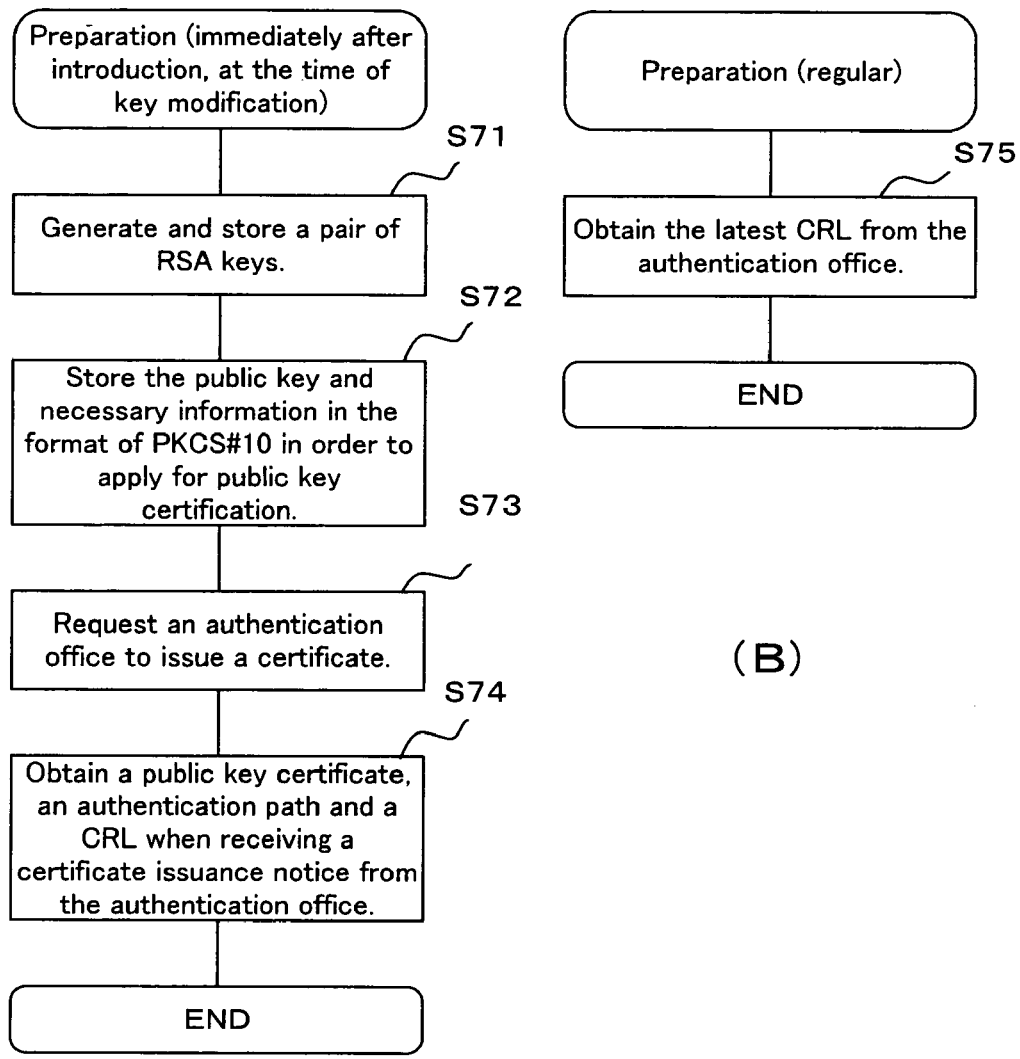
FIGS. 10A and 10B are the flowcharts of a preparation process.

Next, FIG. 9 shows the data alteration detection method of the second preferred embodiment. In this second preferred embodiment, an alteration detection code is generated by a digital signature, using a public key encryption.

The data alteration detection method is described below with reference to FIG. 9 and the flowcharts shown in FIGS. 10 through 15. The following process is performed by the CPU of the data alteration detection device.

FIGS. 10A and 10B are flowcharts showing both a process of introducing or modifying a public key and the preparation process of obtaining a certificate revocation list (CRL) from an authentication office.

Immediately after introducing a public key or at the time of modifying the key, the CPU performs the process shown in FIG. 10A as preparation.

Firstly, a pair of the secret key and public key of a public key encryption RSA key is generated and stored (S71 shown in FIG. 10A).

Then, in order to apply for the authentication of a public key, both a public key and necessary information are stored in PKCS#10 format specifying encryption data format (S72 shown in FIG. 10A).

Then, a certificate issue request is transmitted to the authentication office (S73 shown in FIG. 10A). If a certificate issuance notice is received from the authentication office, a public key certificate, an authentication path and a certificate revocation list are obtained (S74 shown in FIG. 10A).

By regularly performing the process in step S75 shown in FIG. 10B, the latest certificate revocation list is also obtained from the authentication office.

Next, the process of generating a record alteration detection code, using a digital signature when storing data in the record of the database 34 is described with reference to the flowchart shown in FIG. 11.

Figure 11:
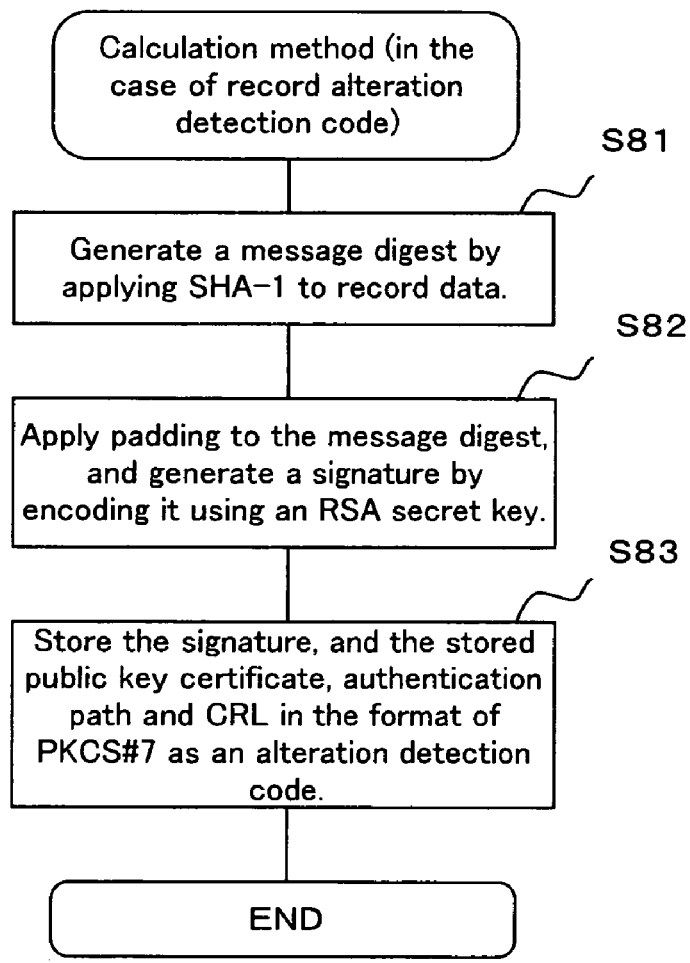
FIG. 11 is the flowchart of a record alteration detection code calculation process.

A message digest is generated by applying secure hash algorithm (SHA)-1, which is one of hash operations, to data to be written into the database shown in FIG. 2 (S81 shown in FIG. 11).

Then, padding is applied to the generated message digest (a bit is added) so as to meet a prescribed format, and a digital signature is generated by encoding the message digest, using the RSA encryption private key (secret key)(S82 shown in FIG. 11).

Then, the generated digital signature, the public key certificate obtained from the authentication office, the authentication path and the certificate revocation list are store in PKCS#7 format and are stored in the corresponding record of the database 34 shown FIG. 2 as an alteration detection code.

By the above-mentioned processes in steps S81 through 83, as shown in FIG. 9, a message digest is generated by applying hash operation SHA-1 to data to write, and a digital signature is generated by encoding the message digest, using the RSA encryption private key. An alteration detection code is generated in PKCS#7 format by attaching a public key certificate composed of an owner, a public key, an issuer (authentication office) and the signature of the issuer, a authentication path composed of public key certificates of authentication offices up to a route authentication office and a certificate revocation list to the digital signature.

Next, The generation of an inter-record alteration detection code by a digital signature is described with reference to the flowchart shown in FIG. 12.

Figure 12:
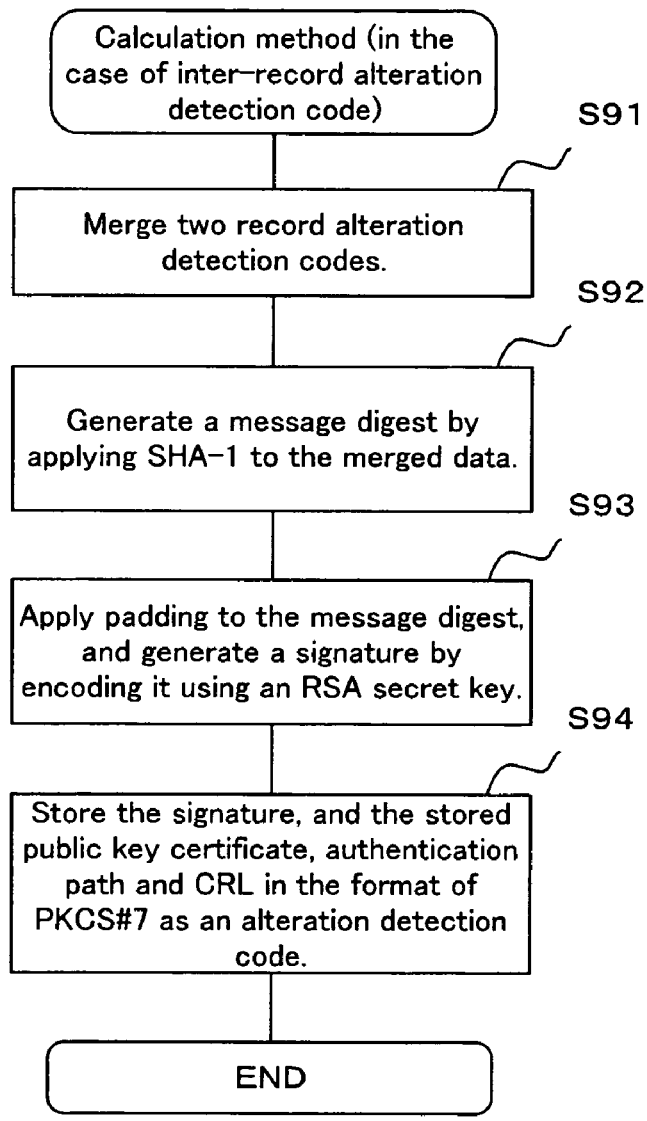
FIG. 12 is the flowchart of an inter-record alteration detection code calculation process.

Firstly, the record alteration detection code of the current record calculated by the above-mentioned record alteration detection code calculation unit 32 and the like and the record alteration detection code of the immediately previous record are merged (S91 shown in FIG. 12).

Then, a message digest is generated by applying hash operation SHA-1 to the merged data (S92 shown in FIG. 12).

Then, padding is applied to the generated message digest so as to meet a prescribed format, and a digital signature is generated by encoding the generated message digest, using the RSA encryption secret key (S93 shown in FIG. 12).

Then, the generated digital signature, the public key certificate obtained by the authentication office, the authentication path and certificate revocation list are stored in PKCS#7 format as an inter-record alteration detection code (S94 shown in FIG. 12).

By the above-mentioned processes in FIGS. 11 and 12, a record alteration detection code and an inter-record alteration detection code are generated using a digital signature.

Next, the verification method of the record alteration detection code generated by a digital signature in PKCS#7 format is described with reference to the flowchart shown in FIG. 13.

Figure 13:
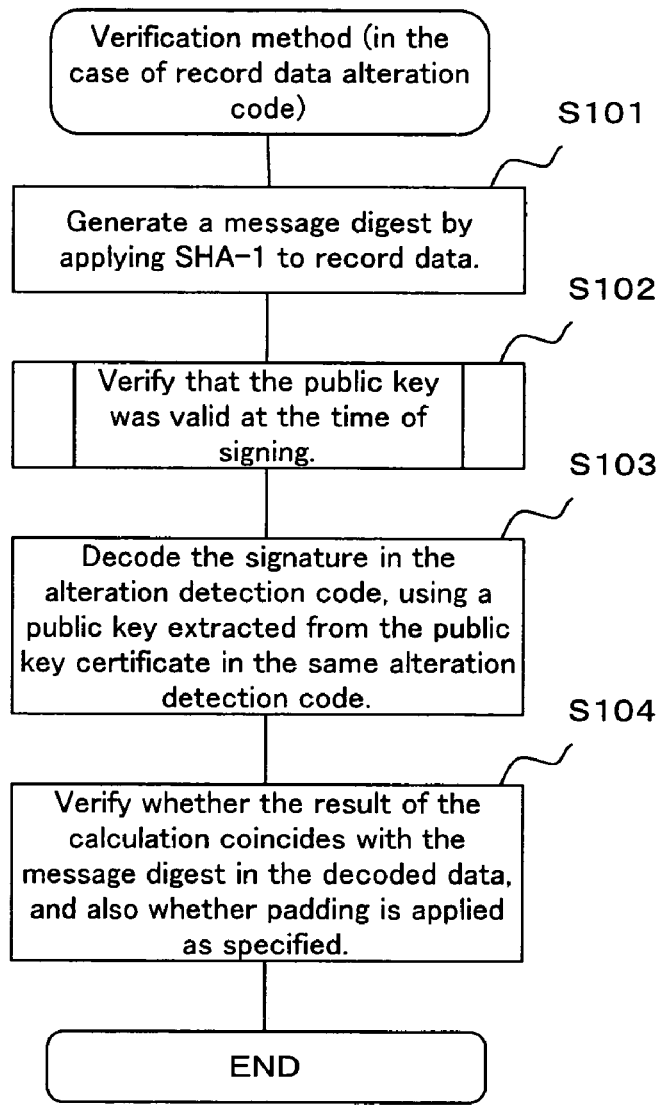
FIG. 13 is the flowchart of a record alteration detection code verification process.

A message digest is generated by applying hash operation SHA-1 to the data of a record to be read from the database 34 (S101 shown in FIG. 13).

Then, it is verified that the public key of a signer was valid when the digital signature was generated (S102 shown in FIG. 13). This public key is verified based on the public key certificate of the authentication office stored in the authentication path of the alteration detection code. The verification process of this public key is described later.

Then, the digital signature in the record alteration detection code is decoded using the public key (RSA encryption public key) of the signer (S103 shown in FIG. 13).

Then, it is verified whether the message digest in the data decoded by the public key of the signer coincides with the message digest obtained by applying hash operation SHA-1 to the record alteration detection code calculated using the data of the record and whether padding is applied as specified. Since in padding applied to a message digest, data is added in the format specified by PKCS#7, the message digest can be extracted from the data decoded by the public key.

By the above-mentioned process shown in FIG. 13, it can be confirmed that the record alteration detection code of data to be read from the database 34 is generated by a legal signer, and also that the record alteration detection code is not altered. Since the record alteration detection code is verified by comparing it with the message digest of the record alteration detection code calculated using the record data, it can be confirmed that the record data is not altered.

Next, the verification method of an inter-record alteration detection code generated by a digital signature is described with reference to the flowchart shown in FIG. 14.

Figure 14:
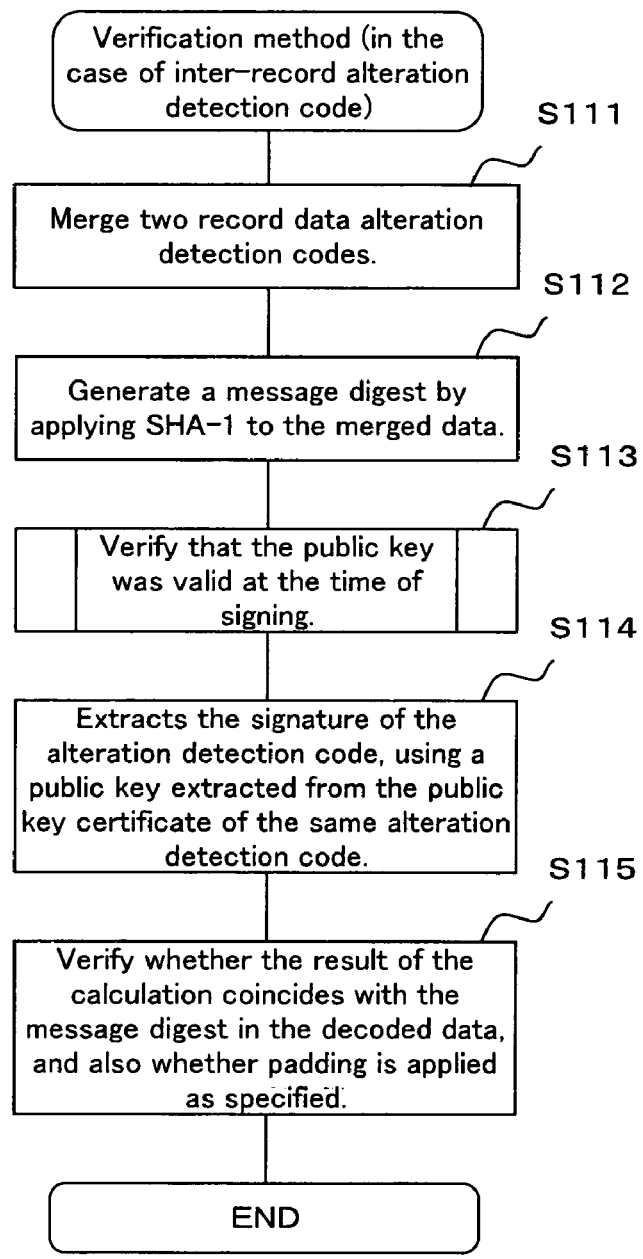
FIG. 14 is the flowchart of an inter-record alteration detection code calculation process.

The respective record alteration detection codes of a record to read and the immediately previous record are merged (S111 shown in FIG. 14).

Then, a message digest is generated by applying hash operation SHA-1 to the merged data (S112 shown in FIG. 14).

Then, it is verified that the public key of a signer was valid when the digital signature was generated (S113 shown in FIG. 14).

The signature in the inter-record alteration detection code is decoded using a public key extracted from the public key certificate in the inter-record alteration detection code (S114 shown in FIG. 14).

Then, it is verified whether the message digest in the data decoded by the public key coincides with the message digest of the inter-record alteration detection code calculated using the record alteration detection code of the immediately previous record of the current record, and also whether padding is applied to the decoded data as specified (S115 shown in FIG. 14).

If in the verification of step S115, it is determined that the message digests coincide, it can be confirmed that the signature of the inter-record alteration detection code in PKCS#7 is that of the owner of the public key and also that the inter-record alteration detection code of the current record is not altered. Thus, it is verified that the data of the current record is not altered.

However, if in the verification of step S115, it is determined that the message digests do not coincide, it is determined that the signature of the inter-record alteration detection code in PKCS#7 format is false, or that the data is illegally deleted or added. As a result, it is determined that the inter-record alteration detection codes do not coincide. Thus, by the verification in step S115, it can be detected that the record data is altered by deletion, addition and the like.

Next, the process of verifying that the public key was valid when a signature is generated in step S102 of FIG. 13 and step S113 of FIG. 14, is described with reference to the flowchart shown in FIG. 15.

Figure 15:
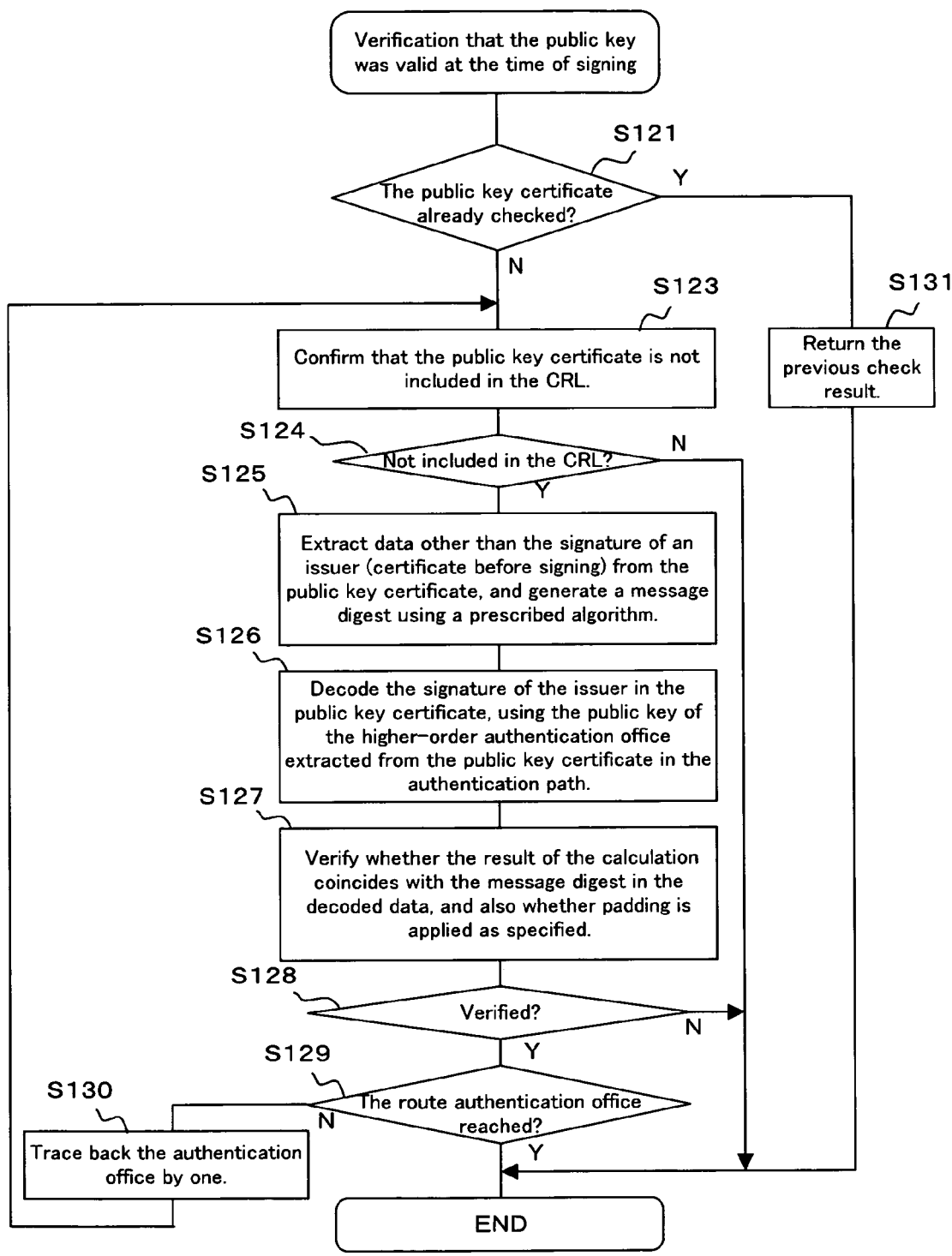
FIG. 15 is the flowchart of a public key verification process.

It is determined whether the public key certificate stored in the record alteration detection code or inter-record alteration detection code in PKCS#7 format is already verified (S121 shown in FIG. 15). If the public key certificate is already verified (yes in S12), the process proceeds to step S131, and the result of the previous verification is returned.

If the public key certificate is not verified yet (no in S121), the process proceeds to step S123, and it is confirmed that the public key certificate is not registered in the latest certificate revocation list yet. Then, it is determined whether the public key certificate is not registered in the certificate revocation list (S124 shown in FIG. 15).

If the public key stored in the public key certificate is not registered in the certificate revocation list (yes in S124), the process proceeds to step S125, In step S125, data other than the signature of the issuer (authentication office in the first layer) is extracted from the first public key certificate in the authentication path, and a message digest is generated from the data, using a prescribed algorithm (S125 shown in FIG. 15).

Then, the digital signature of the issuer (authentication office) in the first public key certificate of the authentication path is decoded using the public key of the authentication office in the public key certificate (S126 shown in FIG. 15).

Then, it is verified whether the message digest in the data decoded, using the public key of the authentication office coincides with the message digest generated from the data of the public key certificate, using the prescribed algorithm and also whether padding is applied as specified (S127 shown in FIG. 15). Then, it is determined whether the result is verified, that is, the message digests coincide (S128 shown in FIG. 15).

If the message digests coincide and the result is verified (yes in S128), the process proceeds to step S129, and it is determined whether the authentication office is the route authentication office (the highest-order authentication office). If the authentication office is not the route authentication office (no in S129), the process proceeds to step S130. In step S130, the authentication path is traced back, and the subsequent public key certificate in the authentication path is obtained in order to verify the higher-order authentication office. Then, the process returns to step S123, and the processes in steps S123 through S130 are repeated.

Firstly, in steps S123 and 124, it is confirmed that the public key of the authentication office that has issued the public key certificate of the data creator is not registered. Then, in step S125, a message digest is generated from data other than the signature of the public key certificate of the authentication office in the authentication path. Furthermore, the signature in the public key certificate is decoded using the public key of the higher-order authentication office, which is the issuer of the public key certificate, and it is verified whether the message digest in the decoded data coincides with the generated message digest. If both coincide, the lower-order authentication office, which is the signer, can be guaranteed by the higher-order authentication office. When the authentication path can be traced back and the route authentication office is reached by repeating the same process, it can be confirmed that the public key of the signer of the alteration detection code was valid.

By the above-mentioned processes in steps S123 through S130, it can be confirmed that at the time of signing, the public key of the signer of the alteration detection code (record alteration detection code and inter-record alteration detection code) was guaranteed by the authentication office and valid.

According to the second preferred embodiment, an alteration detection code (record alteration detection code and inter-record alteration detection code) can be generated using a digital signature and both are stored. When reading data, it can be determined whether the data is altered, by decoding the data, using the public key of a signer, stored in the record alteration detection code and inter-record alteration detection code and comparing the message digest of the record alteration detection code generated from the data with that of the inter-record alteration detection code generated from the respective record alteration detection codes of the current record and the immediately previous record. Thus, it can be detected whether the data is altered.

In the second preferred embodiment, since an alteration detection code can be verified using the public key of the public key certificate of the alteration detection code, persons other than the creator of the database 34 can verify an alteration detection code.

Since an RSA encryption digital signature is used, it is difficult to illegally generate an alteration detection code.

The present invention can also be configured as follows.

(1) The application of the present invention is not limited to data in the format of a record, and the present invention can be applied to arbitrary data, a file and the like whose format is not specified.

(2) The calculation of an inter-record alteration detection code is not limited to that using both the alteration detection code of the immediately previous record (data) and the alteration detection code of the current record, and it can also be calculated using two or more segments of record information (other than a alteration detection code), such as two segments of information about the immediately previous record of the current record and the twice previous record of the current record, or three segments of information about the immediately previous record of the current record, the twice previous record of the current record and the three times previous record of the current record.

(3) The calculation of an inter-record alteration detection code is not limited to the merging of the respective record alteration detection codes of the immediately previous and the current record, and an inter-record alteration detection code can also be calculated using at least the immediately previous record data and the data of the current record without generating a record alteration detection code.

(4) The database 34 for storing data is not always disposed inside the data alteration detection device, and it can also be another data storage device connected via a network.

According to the present invention, when writing data, the alteration, such as modification, deletion, addition of data can be detected without the increase of a processing time by generating an inter-data alteration detection code, using both the immediately previous data and data to write.

What is claimed is:

1. A data alteration detection method for detecting whether any data record of a database is altered, comprising:
   calculating a data alteration detection code of data to write current time when writing data in a data storage unit in a prescribed order;
   calculating an inter-data record alteration detection code based on a data alteration detection code of at least immediately previous data record of the data record to write current time and a data alteration detection code of the data record to write current time;
   relating to each other and storing the data to write current time, the data alteration detection code and the inter-data alteration detection code in the data storage unit;
   calculating a data alteration detection code of the data to read when reading the data stored in the data storage unit, and verifying whether the calculated data alteration detection code coincides with the data alteration detection code stored in correspondence with the data to read;
   calculating an inter-data alteration detection code based on the data alteration detection code of the data to read and the data alteration detection code of at least the immediately previous data record; and
   verifying whether the calculated inter-data alteration detection code coincides with the inter-data alteration detection code stored in correspondence with the data to read.

2. The data alteration detection method according to claim 1, comprising steps of providing a computer, providing a computer-readable storage medium which stores a program for enabling the computer to execute the steps of claim 1, uploading the program onto the computer, and executing the steps of claim 1 with the computer according to the program.

3. The data alteration detection method according to claim 1, comprising detecting a target plurality of segments of data by calculating only respective inter-data alteration detection codes between two segments of individual target data.

4. A data alteration detection method for detecting whether any data record of a database is altered, comprising:
   calculating an inter-data alteration detection code based on immediately previous data record of data record to write current time and the data record to write current time when writing data in a data storage unit in a prescribed order;
   relating to each other and storing the data record to write current time and the inter-data alteration detection code in the data storage unit;
   calculating an inter-data alteration detection code based on the data to read and at least immediately previous data record of the data record when reading the data in the data storage unit, and verifying whether the calculated inter-data alteration detection code coincides with the inter-data alteration detection code stored in correspondence with the data to read.

5. The data alteration detection method according to claim 4, comprising detecting a target plurality of segments of data by calculating only respective inter-data alteration detection codes between two segments of individual target data.

6. A data alteration detection method for detecting whether any data record of a database is altered, comprising:
   calculating a record alteration detection code of data record to write current time when writing data in a data storage unit in a prescribed order;
   calculating an inter-record alteration detection code based on a record alteration detection code of at least immediately previous record of the record to write current time and the record alteration detection code of the data to write current time;
   writing the data, the record alteration detection code and the inter-record alteration detection code into the record to write current time;
   calculating a record alteration detection code of a record to read when reading a record from the data storage unit, and verifying whether the calculated record alteration detection code coincides with the record alteration detection code stored in the record to read;
   calculating an inter-record alteration detection code based on the record alteration detection code of the record to read and the record alteration detection code of at least the immediately previous record, and verifying whether the calculated inter-record alteration detection code coincides with the inter-record alteration detection code stored in the record to read.

7. The data alteration detection method according to claim 6, comprising detecting a target plurality of segments of data by calculating only respective inter-data alteration detection codes between two segments of individual target data.

8. A data alteration detection device to detect whether any data record of a database is altered, comprising:
   data alteration detection code calculation unit calculating data alteration detection code of data to be written in a data storage unit;
   inter-data alteration detection code calculation unit calculating an inter-data alteration detection code based on a data alteration detection code of at least immediately previous data record of the data record to write current time and a data alteration detection code of the data to write current time;
   data writing unit relating and writing the data, the data alteration detection code and the inter-data alteration detection code in the data storage unit;
   data reading unit reading data from the data storage unit;
   data alteration detection code verification unit calculating a data alteration detection code of the read data, and verifying whether the calculated data alteration detection code coincides with the data alteration detection code stored in correspondence with the read data; and
   inter-data alteration detection code verification unit calculating an inter-data alteration detection code based on the data alteration detection code of the read data and the data alteration detection code of at least the immediately previous data record, and verifying whether the calculated inter-data alteration detection code coincides with the inter-data alteration detection code stored in correspondence with the read data.

9. The data alteration detection device according to claim 8, comprising:

a data alteration detection unit calculating the data alteration detection code of data to write and storing the calculated data alteration detection code in the data storage unit in correspondence with the data to write;

wherein the data alteration detection unit calculates the data alteration detection code of at least immediately previous data record of the data record to write and the data alteration detection code calculated by the data alteration detection code calculation unit, and stores the calculated inter-data alteration detection code in the data storage unit in correspondence with the data to write.

10. The data alteration detection device according to claim 9, wherein a target plurality of segments of data is detected by calculating only respective inter-data alteration detection codes between two segments of individual target data.

11. The data alteration detection device according to claim 8, wherein a target plurality of segments of data is detected by calculating only respective inter-data alteration detection codes between two segments of individual target data.

12. A data alteration detection device to detect whether any data record of a database is altered, comprising:

a first calculating unit calculating a data alteration detection code of data to write current time when writing data in a data storage unit in a prescribed order;

a second calculating unit calculating an inter-data record alteration detection code based on a data alteration detection code of at least immediately previous data record of the data record to write current time and a data alteration detection code of the data record to write current time;

a relating unit relating to each other and storing the data to write current time, the data alteration detection code and the inter-data alteration detection code in the data storage unit;

a third calculating unit calculating a data alteration detection code of the data to read when reading the data stored in the data storage unit. and verifying whether the calculated data alteration detection code coincides with the data alteration detection code stored in correspondence with the data to read;

a fourth calculating unit calculating an inter-data alteration detection code based on the data alteration detection code of the data to read and the data alteration detection code of at least the immediately previous data record; and a verifying unit verifying whether the calculated inter-data alteration detection code coincides with the inter-data alteration detection code stored in correspondence with the data to read.

13. The data alteration detection device according to claim 12, wherein a target plurality of segments of data is detected by calculating only respective inter-data alteration detection codes between two segments of individual target data.

14. A computer-readable storage medium which stores a program for enabling a computer to execute a process to detect whether any data record of a database is altered, said program comprising:

calculating a data alteration detection code of data to read current time when reading data in a data storage unit in a prescribed order;

calculating an inter-data alteration detection code based on a data alteration detection code of at least immediately previous data record of the data record to read current time and the data alteration detection code of the data to read current time;

relating to each other and storing the data to read current time, the data alteration detection code and the inter-data alteration detection code in the data storage unit;

calculating a data alteration detection code of data to read when reading data in the data storage unit, and verifying whether the calculated data alteration detection code coincides with the data alteration detection code stored in correspondence with the data to read;

calculating an inter-data alteration detection code based on the data alteration detection code of the data to read and a data alteration detection code of at least immediately previous data record of the data record, and verifying whether the calculated inter-data alteration detection code coincides with the inter-data alteration detection code stored in correspondence with the data to read.

15. The storage medium according to claim 14, wherein said program includes detecting a target plurality of segments of data by calculating only respective inter-data alteration detection codes between two segments of individual target data.

* * * * *